United States Patent
Nishi et al.

(10) Patent No.: US 11,584,159 B2
(45) Date of Patent: Feb. 21, 2023

(54) VEHICLE WHEEL AND HELMHOLTZ RESONATOR

(71) Applicant: HONDA MOTOR CO., LTD., Tokyo (JP)

(72) Inventors: Masaaki Nishi, Wako (JP); Youichi Kamiyama, Wako (JP); Toshinobu Saito, Wako (JP); Toshimitsu Maki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 1000 days.

(21) Appl. No.: 16/367,969

(22) Filed: Mar. 28, 2019

(65) Prior Publication Data

US 2019/0299708 A1  Oct. 3, 2019

(30) Foreign Application Priority Data

Apr. 2, 2018  (JP) .............................. JP2018-071168

(51) Int. Cl.

| B60B 21/12 | (2006.01) |
|---|---|
| B60C 19/00 | (2006.01) |
| B60C 5/00 | (2006.01) |
| B60R 13/08 | (2006.01) |
| G10K 11/172 | (2006.01) |

(52) U.S. Cl.
CPC .......... *B60B 21/12* (2013.01); *B60R 13/0884* (2013.01); *G10K 11/172* (2013.01); *B60B 2310/318* (2013.01); *B60B 2900/133* (2013.01)

(58) Field of Classification Search
CPC ... B60B 21/12; B60B 21/02; B60B 2900/133; B60B 2310/318; B60R 13/0884; B60R 13/08; B60C 5/00; B60C 19/00; B60C 19/002; G10K 11/172; G10K 11/16

See application file for complete search history.

(56) References Cited

U.S. PATENT DOCUMENTS

| 7,896,043 | B2 * | 3/2011 | Kashiwai | ............ B60C 23/0408 152/381.6 |
|---|---|---|---|---|
| 7,896,044 | B2 * | 3/2011 | Kashiwai | ................ B60C 19/00 152/381.6 |
| 8,490,665 | B2 * | 7/2013 | Nagata | .................. B60B 21/023 152/381.6 |
| 9,545,820 | B2 * | 1/2017 | Parrett | .................... B60B 21/12 |
| 9,694,626 | B2 * | 7/2017 | Kamiyama | .......... G10K 11/172 |
| 9,701,157 | B2 * | 7/2017 | Kamiyama | ............. B60B 21/12 |

(Continued)

FOREIGN PATENT DOCUMENTS

| EP | 0663306 A2 * | 7/1995 |
|---|---|---|
| JP | 2004306760 A * | 11/2004 |

(Continued)

*Primary Examiner* — Edgardo San Martin
(74) *Attorney, Agent, or Firm* — Rankin, Hill & Clark LLP

(57) ABSTRACT

A vehicle wheel has a Helmholtz resonator (sub-air chamber member) mounted thereon with an adhesive material, and a thickness of the adhesive material on a part (adhesive strength increasing part) of the Helmholtz resonator on which centrifugal force acts strongly during rotation of the wheel is set to be thicker than a thickness of the adhesive material on other parts (regular part) of the Helmholtz resonator. When the thickness of the adhesive material is increased, peel strength of the adhesive material is enhanced accordingly.

5 Claims, 7 Drawing Sheets

(56) References Cited

U.S. PATENT DOCUMENTS

| 10,504,500 | B2 * | 12/2019 | Kamiyama | B60B 21/12 |
| 11,046,111 | B2 * | 6/2021 | Kamiyama | B60B 21/02 |
| 2014/0346843 | A1 * | 11/2014 | Kamiyama | B60B 21/12 |
| | | | | 301/5.1 |
| 2019/0275847 | A1 * | 9/2019 | Nishi | B60C 19/002 |
| 2019/0299707 | A1 * | 10/2019 | Saito | B60B 21/026 |
| 2019/0366763 | A1 * | 12/2019 | Nishi | B60C 19/002 |
| 2020/0009905 | A1 * | 1/2020 | Kamiyama | B60B 21/12 |

FOREIGN PATENT DOCUMENTS

| JP | 2006256535 | A | * | 9/2006 |
| JP | 2008279911 | A | * | 11/2008 |
| JP | 2012-045971 | A | | 3/2012 |
| JP | 2014201205 | A | * | 10/2014 |
| JP | 2019199094 | A | * | 11/2019 |
| KR | 100777754 | B1 | * | 11/2007 |
| KR | 20130130343 | A | * | 12/2013 |
| KR | 20180013177 | A | * | 2/2018 |

* cited by examiner

VEHICLE WHEEL AND HELMHOLTZ RESONATOR

CROSS-REFERENCE TO RELATED APPLICATION

This application is based upon and claims priority from the Japanese Patent Application No. 2018-071168, filed on Apr. 2, 2018, the entire contents of which are incorporated herein by reference.

BACKGROUND OF THE INVENTION

1. Field of the Invention

The present invention relates to a vehicle wheel.

2. Description of the Related Art

As an example of conventional art, there is known a Helmholtz resonator which is disposed on an outer circumferential surface of a well part in a wheel, and both edges of which projecting in the wheel width direction are engaged with a circumferential groove of a rim (for example, see Patent document 1: Japanese Unexamined Patent Application Publication No. 2012-45971).

The Helmholtz resonator allows the both edges thereof to be elastically deformed when pressed against the outer circumferential surface of the well part, thereby being easily fitted into the circumferential groove of the rim. Consequently, the Helmholtz resonator can be easily mounted on the wheel.

However, the conventional wheel with the Helmholtz resonator (for example, see Patent document 1) requires cutting and forming the circumferential groove for mounting the resonator on the rim. For this reason, the wheel has posed a problem in that a manufacturing process thereof becomes complicated to increase a manufacturing cost.

In order to solve the problem, for example, a resonator mounting structure is conceived in which the Helmholtz resonator is fixed to the outer circumferential surface of the well part with an adhesive material.

However, in the Helmholtz resonator mounted on the outer circumferential surface of the well part, an extremely large centrifugal force is generated by high-speed rotation of the tire during vehicle traveling. For this reason, a vehicle wheel has been demanded which further improves fixing strength of the Helmholtz resonator mounted on the rim with an adhesive material.

The present invention has therefore been made in view of the above problems, and an object of the invention is to provide a vehicle wheel capable of further improving fixing strength of a Helmholtz resonator mounted on a rim with an adhesive material.

SUMMARY OF THE INVENTION

In order to attain the above object, according to an aspect of the present invention, a vehicle wheel reflecting one aspect of the present invention includes a Helmholtz resonator mounted thereon with an adhesive material, wherein a thickness of the adhesive material on a part of the Helmholtz resonator on which centrifugal force acts strongly during rotation of the wheel is set to be thicker than a thickness of the adhesive material on other parts of the Helmholtz resonator.

The vehicle wheel reflecting one aspect of the present invention thus makes it possible to further improve fixing strength of the Helmholtz resonator mounted on the rim with an adhesive material.

BRIEF DESCRIPTION OF THE DRAWINGS

The features and advantages provided by one or more embodiments of the invention will become apparent from the detailed description given below and appended drawings which are given only by way of illustration, and thus are not intended as a definition of the limits of the present invention.

DETAILED DESCRIPTION OF THE PREFERRED EMBODIMENTS

Hereinafter, vehicle wheels according to embodiments of the present invention will be described in detail with reference to the drawings as appropriate.

In the description below, overall structure of a vehicle wheel will be first described, and then description will be given of a sub-air chamber member serving as a Helmholtz resonator and of a mounting structure of the sub-air chamber member on a rim by an adhesive material. Note that in FIG. 1 to FIG. 9 to be referred to, reference sign "X" denotes a wheel circumferential direction; reference sign "Y" denotes a wheel width direction; and reference sign "Z" denotes a wheel radial direction. Moreover, in the wheel width direction Y, an inner side is defined as "one side" and an outer side is defined as "other side".

Overall Structure of Vehicle Wheel

Figure 1:
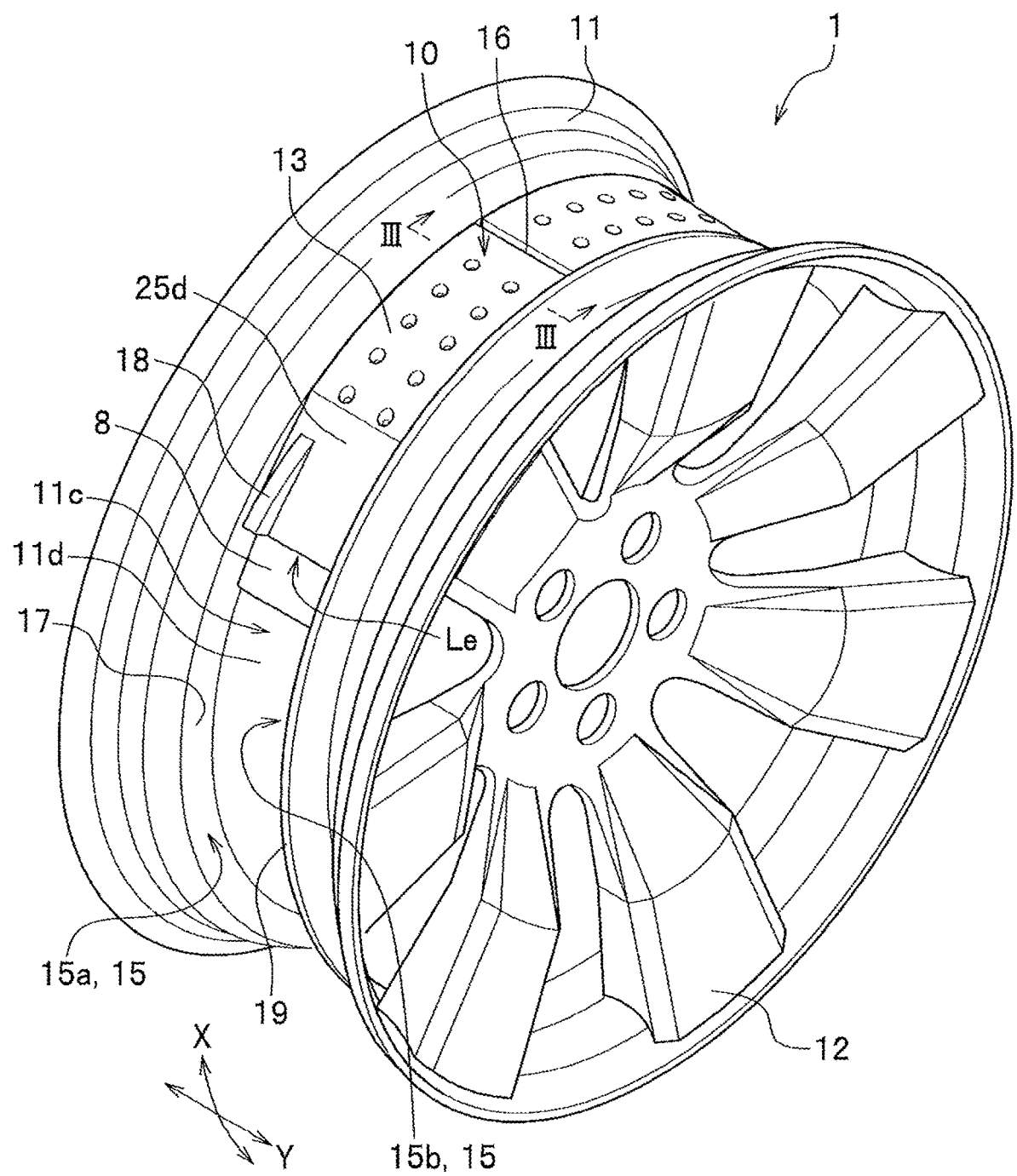
FIG. 1 is a perspective view of a vehicle wheel according to an embodiment of the present invention.

FIG. 1 is a perspective view of a vehicle wheel 1 according to an embodiment of the present invention.

As shown in FIG. 1, the vehicle wheel 1 according to the present embodiment is configured to allow an sub-air chamber member 10 (Helmholtz resonator) made of a synthetic resin such as polyamide resin to be mounted on a rim 11 made of metal such as aluminum alloy and magnesium alloy.

Moreover, the vehicle wheel 1 is provided with a stopper 41 as described in detail later.

In FIG. 1, reference sign 12 denotes a disk 12 for connecting the rim 11 to a hub (not shown).

The rim 11 includes a well part 11c which is recessed inward (toward a rotation center) in the wheel radial direction between bead seats (not shown) formed on both end parts of the rim 11 in the wheel width direction Y. An outer circumferential surface 11*d* of the well part 11*c* is defined by a bottom face of the concave part and has substantially the same diameter on the wheel shaft throughout the wheel width direction Y.

The rim 11 in the present embodiment is provided with a vertical wall 15*a* and a vertical wall 15*b*. The vertical walls 15*a*, 15*b* rise from the outer circumferential surface 11*d* outward in the wheel radial direction with a predetermined distance between each other in the wheel width direction Y. Note that the rim 11 in the present embodiment is not limited to this configuration, but may adopt configuration not having the vertical walls 15*a*, 15*b* as described later.

The vertical wall 15*a* formed at the one side (inner side) in the wheel width direction Y is formed in a rising part 17 that erects from the outer circumferential surface 11*d* of the well part 11*c* toward a rim flange side. Moreover, the vertical wall 15*b* is configured by a circumferential wall 19 that extends in the wheel circumferential direction X at the middle in the wheel width direction Y of the outer circumferential surface 11*d*. Note that in the description below, the vertical walls 15*a*, 15*b* are each simply referred to as a vertical wall 15 where they are not particularly distinguished from each other.

The vertical walls 15*a*, 15*b* annularly extend in the wheel circumferential direction X with a predetermined distance between each other, thereby forming side faces 14 (see FIG. 3) that face each other as described later. The side faces 14 are formed so that an angle between each of the side faces 14 and the outer circumferential surface 11*d* (see FIG. 3) is substantially a right angle.

Sub-Air Chamber Member

Next, the sub-air chamber member 10 will be described.

Figure 2:
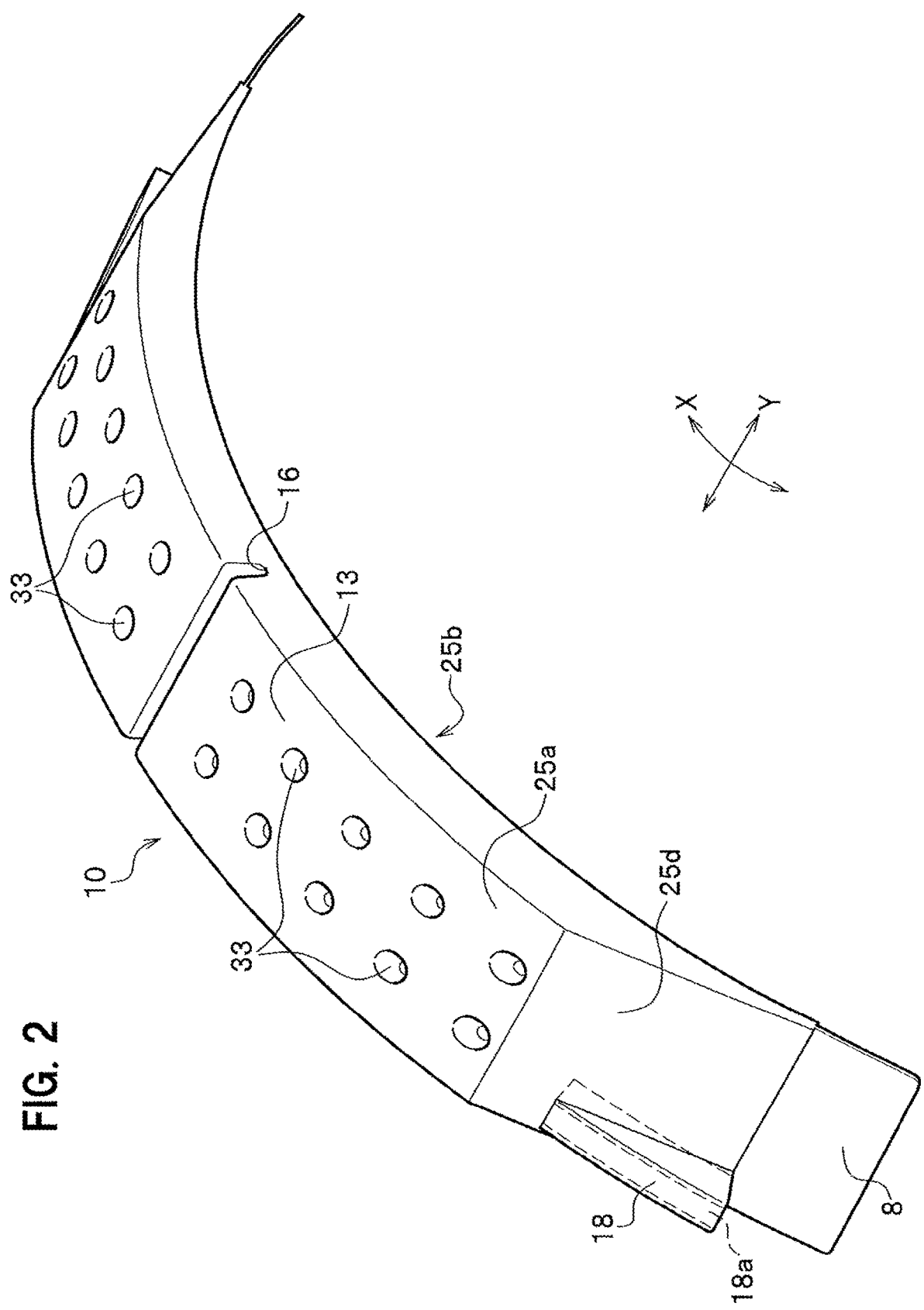
FIG. 2 is an overall perspective view of a sub-air chamber member.
Figure 3:
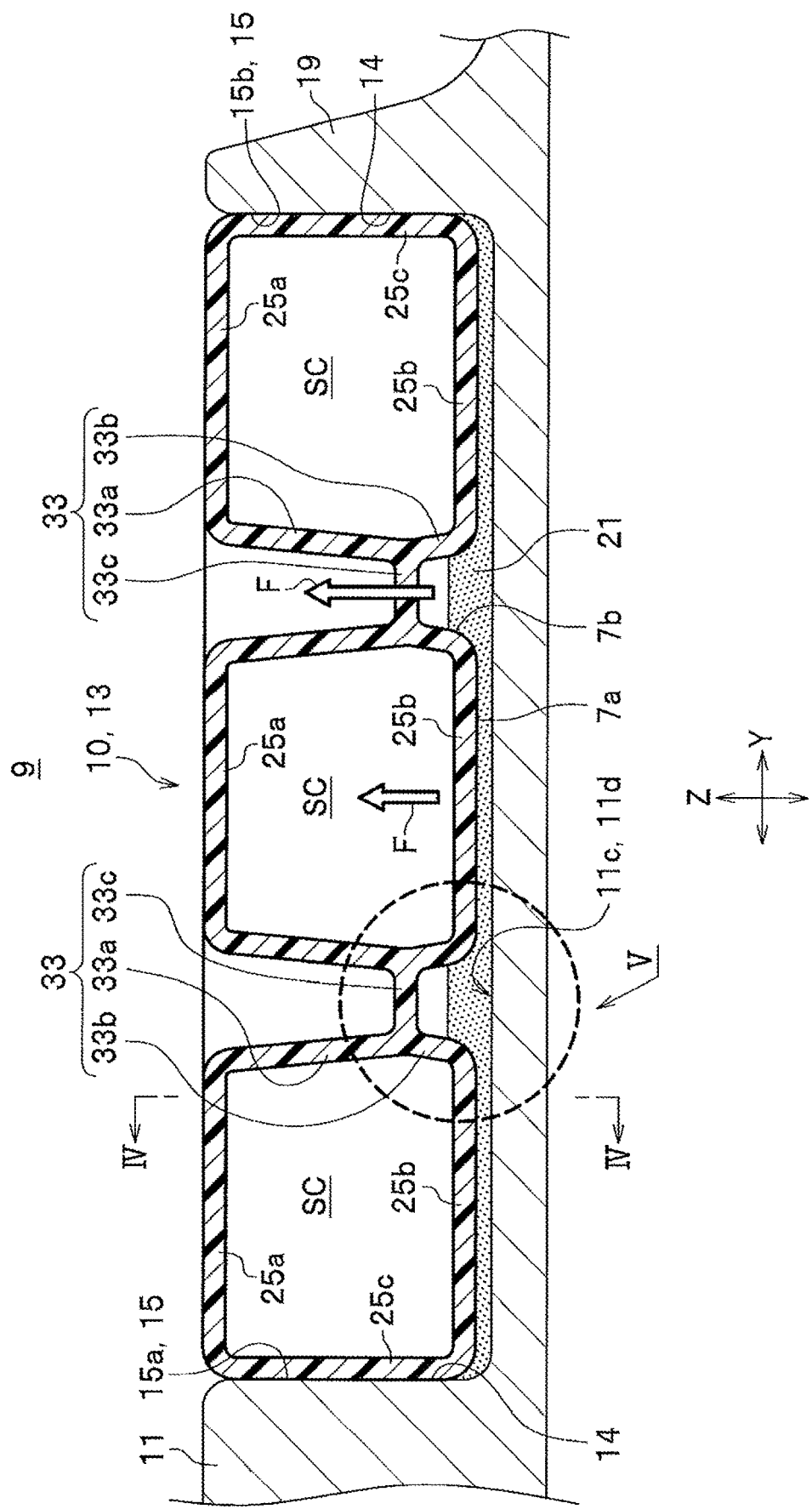
FIG. 3 is a sectional view taken along the line in FIG. 1.
Figure 4:
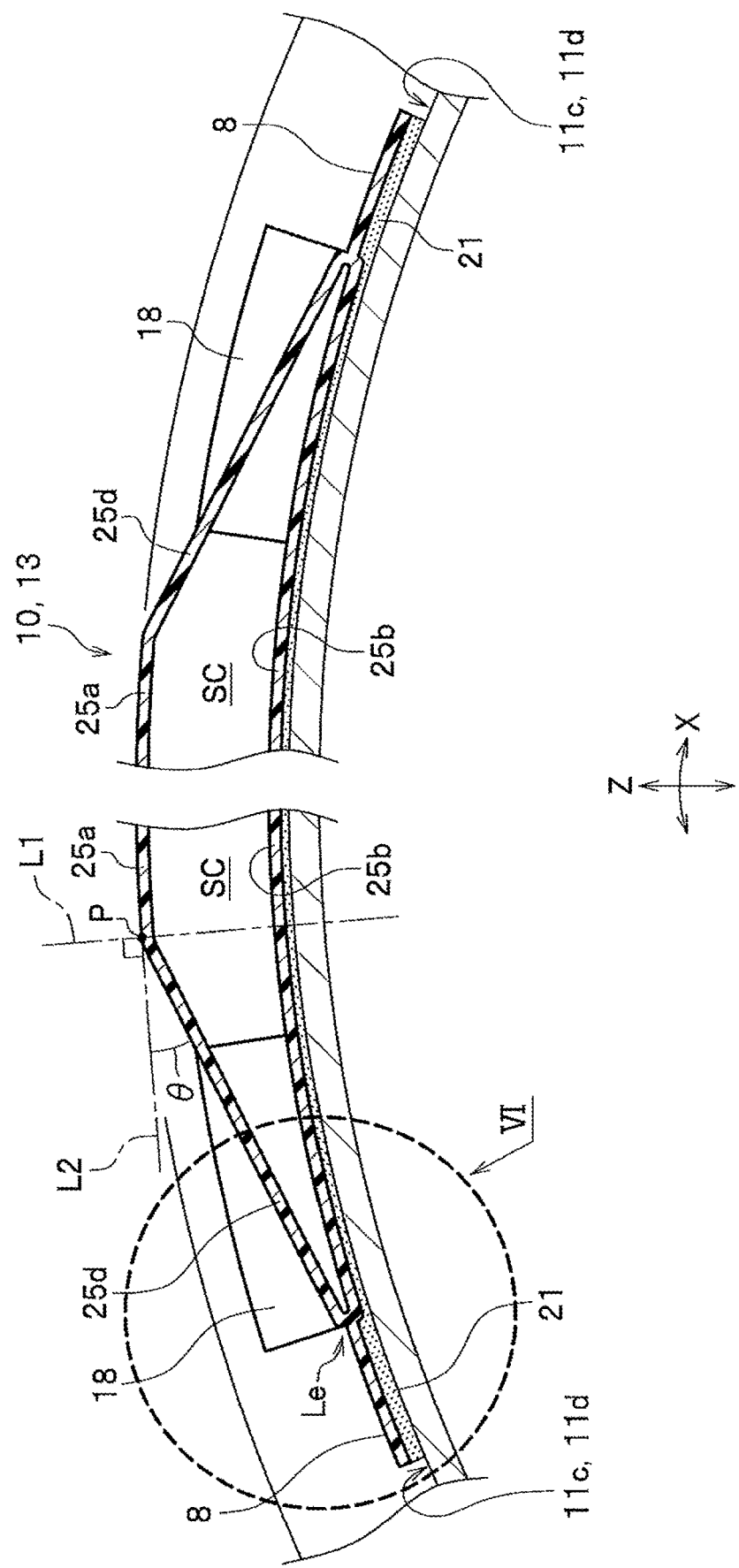
FIG. 4 is a partially omitted and enlarged longitudinal sectional view taken along the IV-IV line in FIG. 3.

FIG. 2 is an overall perspective view of the sub-air chamber member 10. FIG. 3 is a sectional view taken along the III-III line in FIG. 1. FIG. 4 is a partially omitted and enlarged longitudinal sectional view taken along the IV-IV line in FIG. 3.

As shown in FIG. 2, the sub-air chamber member 10 is a member elongated in the wheel circumferential direction X and includes a main body 13, a tubular body 18 and a plate-like extension part 8. The sub-air chamber member 10 is configured to have a symmetric shape in the wheel circumferential direction X with respect to a partition wall 16 that extends in the wheel width direction Y at the center of the main body 13.

The main body 13 is curved in a longitudinal direction thereof. In other words, the main body 13 is configured to follow the wheel circumferential direction X when the sub-air chamber member 10 is mounted on the outer circumferential surface 11*d* (see FIG. 1) of the well part 11*c* (see FIG. 1).

The main body 13 has a hollow part inside. The hollow part (not shown) forms a sub-air chamber SC (see FIG. 3) as described later. The hollow part is divided by the partition wall 16 into two parts in the wheel circumferential direction X.

As shown in FIG. 3, the main body 13 has a nearly rectangular shape elongated in the wheel width direction Y in cross section orthogonal to the longitudinal direction (the wheel circumferential direction X in FIG. 2).

More specifically, the main body 13 has configuration in which a bottom part 25*b* (bottom plate) that is disposed along the outer circumferential surface 11*d* of the well part 11*c*, side parts 25*c* (side plates) that are disposed along the side faces 14 of the pair of vertical walls 15, and an upper part 25*a* (upper plate) that is disposed to face the bottom part 25*b*, are mutually connected so as to form a nearly rectangular shape.

Thus, the upper part 25*a*, the bottom part 25*b* and the side parts 25*c* are formed to surround the sub-air chamber SC inside the main body 13.

Between the outer circumferential surface 11*d* of the well part 11*c* and the bottom part 25*b*, clearances of predetermined gaps are formed so that an adhesive material 21 having film thicknesses as described later can be interposed.

In the present embodiment, a height of the main body 13 from the outer circumferential surface 11*d* (height in the wheel radial direction Z) is the same as a height of the vertical wall 15. Moreover, a width of the main body 13 (length in the wheel width direction Y) is set to a length at which the main body 13 is fitted between the vertical wall 15*a* and the vertical wall 15*b*.

Moreover, on the premise that the main body 13 is press-fitted between the vertical walls 15*a*, 15*b*, the width of the main body 13 may be set to be longer than a distance between the vertical walls 15*a*, 15*b* to such an extent that the main body 13 receives reaction force from the vertical walls 15*a*, 15*b*. In this case, the width of the main body 13 is preferably set so as not to allow volume of the sub-air chamber SC after the press-fitting to depart from designed volume.

As shown in FIG. 2, the main body 13 has a plurality of (in this embodiment, ten) bridges 33 formed to be arranged at equal intervals in the wheel circumferential direction X. Moreover, the bridges 33 are arranged in two rows in the wheel width direction Y.

As shown in FIG. 3, the bridges 33 are each formed with an upper side connecting part 33*a* and a lower side connecting part 33*b* being joined together at a nearly central position between the upper part 25*a* and the bottom part 25*b*.

Note that the upper side connecting part 33*a* is formed so as to allow the upper part 25*a* to be partially recessed toward the bottom part 25*b*. Moreover, the lower side connecting part 33*b* is formed so as to allow the bottom part 25*b* to be partially recessed toward the upper part 25*a*.

The upper side connecting part 33*a* and the lower side connecting part 33*b* are joined together via a joining part 33*c* which is formed to be displaced to the outer circumferential surface 11*d* side of the well part 11*c* from the central part between the upper part 25*a* and the bottom part 25*b*.

The bridge 33 has a nearly cylindrical shape and partially connects the upper part 25*a* with the bottom part 25*b*. Moreover, the bridge 33 forms circular openings in planar view at corresponding positions in the up-down direction of the main body 13.

Moreover, the main body 13 has an inclined part 25*d* at an end part thereof in the wheel circumferential direction X as shown in FIG. 2.

On the inner side of the inclined part 25*d*, the sub-air chamber SC is formed to allow volume thereof to be gradually reduced from the central part in the wheel circumferential direction X of the main body 13 toward an edge in the wheel circumferential direction X of the main body 13, i.e., toward a leading end Le of the main body 13.

More specifically, as shown in FIG. 4, the inclined part 25*d* is formed by allowing the upper part 25*a* of the main body 13 to be displaced so as to gradually come near the bottom part 25*b* as the upper part 25*a* extends toward the leading end Le of the main body 13, and allowing the upper part 25*a* and the bottom part 25*b* to be connected together at the leading end Le.

The inclined part 25d has an inclination angle θ which is preferably less than 45 degrees and more preferably equal to or less than 30 degrees. Note that, when a connecting point P between the upper part 25a and the inclined part 25d is defined in side view of the main body 13 in FIG. 4, the inclination angle θ in the present embodiment means an angle formed on a narrow-angle side between the inclined part 25d and a perpendicular line L2 that intersects at the connecting point P a line segment L1 that connects the connecting point P with a rotation center (not shown) of the wheel.

Next, the tubular body 18 (see FIG. 1) will be described.

As shown in FIG. 1, the tubular body 18 is formed at a position biased to the one side (the inner side of the vehicle wheel 1) in the wheel width direction Y on the main body 13 so as to protrude from the main body 13 in the wheel circumferential direction X.

The sub-air chamber member 10 in the present embodiment is formed, as described above, into a symmetric shape in the wheel circumferential direction X with respect to the partition wall 16. Accordingly, although only one tubular body 18 is shown in FIG. 1, the tubular bodies 18 in the present embodiment are disposed to form a pair at positions symmetrical to each other on both end parts in the longitudinal direction (the wheel circumferential direction X) of the main body 13.

As shown in FIG. 2, the tubular body 18 has a communication hole 18a formed inside.

The communication hole 18a allows the sub-air chamber SC (see FIG. 3) formed inside the main body 13 to be communicated with a tire air chamber 9 (see FIG. 3) which is to be formed between the well part 11c (see FIG. 3) and a tire (not shown).

Next, the plate-like extension part 8 (see FIG. 1) will be described.

As shown in FIG. 1, the plate-like extension part 8 extends from the leading end Le of the main body 13 in the wheel circumferential direction X.

As shown in FIG. 2, the plate-like extension part 8 is composed of a plate-like body having a rectangular shape in planar view and formed with nearly the same width as the main body 13 in the wheel width direction Y.

The plate-like extension part 8 is curved in the wheel circumferential direction X. That is, the plate-like extension part 8 is configured to follow the wheel circumferential direction X with a predetermined gap when the sub-air chamber member 10 is mounted on the outer circumferential surface 11d (see FIG. 1) of the well part 11c (see FIG. 1).

More specifically, in side view of the main body 13 in FIG. 4, the plate-like extension part 8 in the present embodiment extends in the wheel circumferential direction X so as to have a slightly longer radius of curvature than a radius of curvature in the wheel circumferential direction X of the bottom part 25b, depending on film thicknesses T1, T2 (see FIG. 6) of the adhesive material 21 as described later.

The sub-air chamber member 10 in the present embodiment is a blow molded product using a synthetic resin such as polyamide resin as described above. Note that the above synthetic resin is not specifically limited, but polyamide resin containing polyamide MXD6 (Registered trade mark) as a base resin, and nylon 6 are especially preferably used.

Mounting Structure of Sub-Air Chamber Member

Next, description will be given of a mounting structure of the sub-air chamber member 10 (see FIG. 1) on the rim 11 (see FIG. 1).

As shown in FIG. 3, the sub-air chamber member 10 allows the bottom part 25b of the main body 13 and the outer circumferential surface 11d of the well part 11c to be connected via the adhesive material 21 in the wheel width direction Y.

Moreover, as shown in FIG. 4, the sub-air chamber member 10 allows a lower surface of the plate-like extension part 8 and the outer circumferential surface 11d of the well part 11c to be connected via the adhesive material 21, in addition to adhesion of the main body 13 to the outer circumferential surface 11d, in the wheel circumferential direction X.

Examples of the adhesive material 21 include thermoplastic resin-based adhesive such as ethylene-vinyl acetate resin; thermosetting resin-based adhesive such as epoxy resin, polyurethane resin and polyamide resin; and elastomer-based adhesive such as synthetic rubber and thermoplastic elastomer, but the adhesive material is not limited to these examples.

Incidentally, the form of hardening of the adhesive material 21 is not specifically limited, but chemical reaction hardening is especially preferably used.

The adhesive material 21 can be coated on either the sub-air chamber member 10 or the rim 11. Moreover, the adhesive material 21 can also be coated on both of the sub-air chamber member 10 and the rim 11.

Examples of coating method for the adhesive material 21 include bar coating method, roll coating method, spray coating method, brush coating method, and hot-melt coating method, but the coating method is not limited to these examples.

Next, film thicknesses of the adhesive material 21 will be described.

The vehicle wheel 1 (see FIG. 1) according to the present embodiment allows a thickness of the adhesive material 21 (see FIG. 3) on a part of the sub-air chamber member 10 on which centrifugal force acts strongly during rotation of the wheel to be thicker than a thickness of the adhesive material 21 on other parts of the sub-air chamber member 10.

Herein, "the part on which the centrifugal force acts strongly" means a part at which materials (e.g., synthetic resin) forming the sub-air chamber member 10 unevenly exist, especially a part at which the materials unevenly exist on the outer side in the wheel radial direction Z, in accordance with the expression of centrifugal force F ($F=mr\omega^2$: where m is mass of a mass point in the sub-air chamber member; r is a distance of the mass point from the rotation center of the wheel; and ω is an angle velocity of the mass point).

More specifically, where a regular part of the sub-air chamber member 10 facing the outer circumferential surface 11d of the well part 11c, i.e., the bottom part 25b of the sub-air chamber member 10 is defined as a reference part, "the part on which the centrifugal force acts strongly" is directed to a part on which the centrifugal force acts more strongly than the reference part, e.g., a part at which the bridge 33 shown in FIG. 3 is formed, a part at which the side part 25c is formed, and the plate-like extension part 8 shown in FIG. 4.

Hereinafter, the present invention will be described in detail, taking as an example the case in which the adhesive material 21 is thickly applied on "the formation part of the bridge 33" and "the plate-like extension part 8" as "the part on which the centrifugal force acts strongly".

As shown in FIG. 3, the vehicle wheel 1 according to the present embodiment includes a regular part 7a (the bottom part 25b as the reference part) of the sub-air chamber member 10 (Helmholtz resonator), and an adhesive strength increasing part 7b that is a part (the formation part of the bridge 33) on which the centrifugal force acts more strongly than the regular part 7a during rotation of the wheel, and on which the adhesive material 21 is coated more thickly than the regular part 7a.

Figure 5:
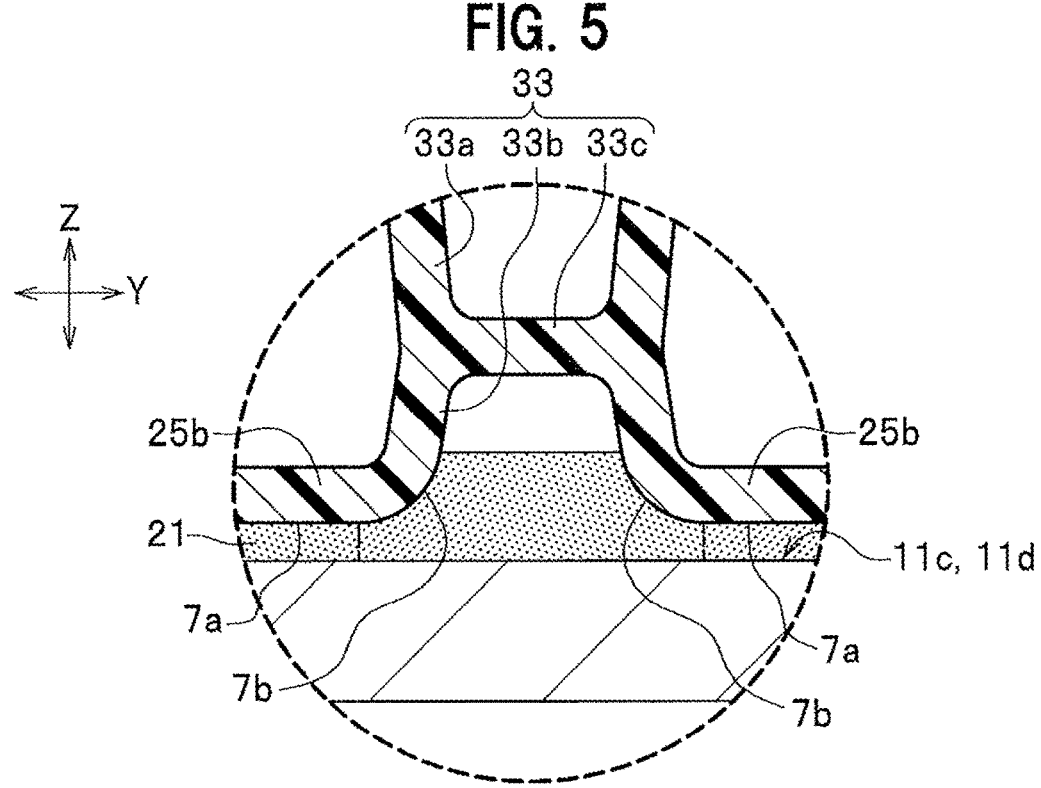
FIG. 5 is a partially enlarged sectional view of the part V indicated by an arrow in FIG. 3.

FIG. 5 is a partially enlarged sectional view of the part V indicated by an arrow in FIG. 3.

As shown in FIG. 5, the adhesive strength increasing part 7b is formed of an opposed surface of the main body 13 that faces the outer circumferential surface 11d of the well part 11c at a lower place of the bridge 33. Moreover, the regular part 7a is formed of part of an opposed surface of the bottom part 25b that faces the outer circumferential surface 11d of the well part 11c, i.e., the opposed surface exclusive of the adhesive strength increasing part 7b.

Above the adhesive strength increasing part 7b thus formed, the bridge 33 is located unlike the regular part 7a. That is, centrifugal force according to the amount of materials (e.g., mass of synthetic resin) forming the bridge 33 is generated in the adhesive strength increasing part 7b. Consequently, as described above, the centrifugal force acts more strongly on the adhesive strength increasing part 7b than on the regular part 7a above which the bridge 33 is not located.

Moreover, the adhesive material 21 is more thickly coated on the adhesive strength increasing part 7b than on the regular part 7a.

Moreover, as described above, the joining part 33c of the bridge 33 is formed to be displaced to the outer circumferential surface 11d side of the well part 11c from the central part between the upper part 25a (see FIG. 3) and the bottom part 25b (see FIG. 3).

Although not shown, the inside of a lower part of the bridge 33 thus formed, i.e., the inside of the lower side connecting part 33b can be filled with the adhesive material 21.

Next, film thicknesses of the adhesive material 21 around the plate-like extension part 8 will be described.

As shown in FIG. 4, the vehicle wheel 1 (see FIG. 1) according to the present embodiment allows the film thickness of the adhesive material 21 between the outer circumferential surface 11d of the well part 11c and the plate-like extension part 8 to be thicker than the film thickness of the adhesive material 21 between the outer circumferential surface 11d of the well part 11c and the bottom part 25b of the main body 13.

Figure 6:
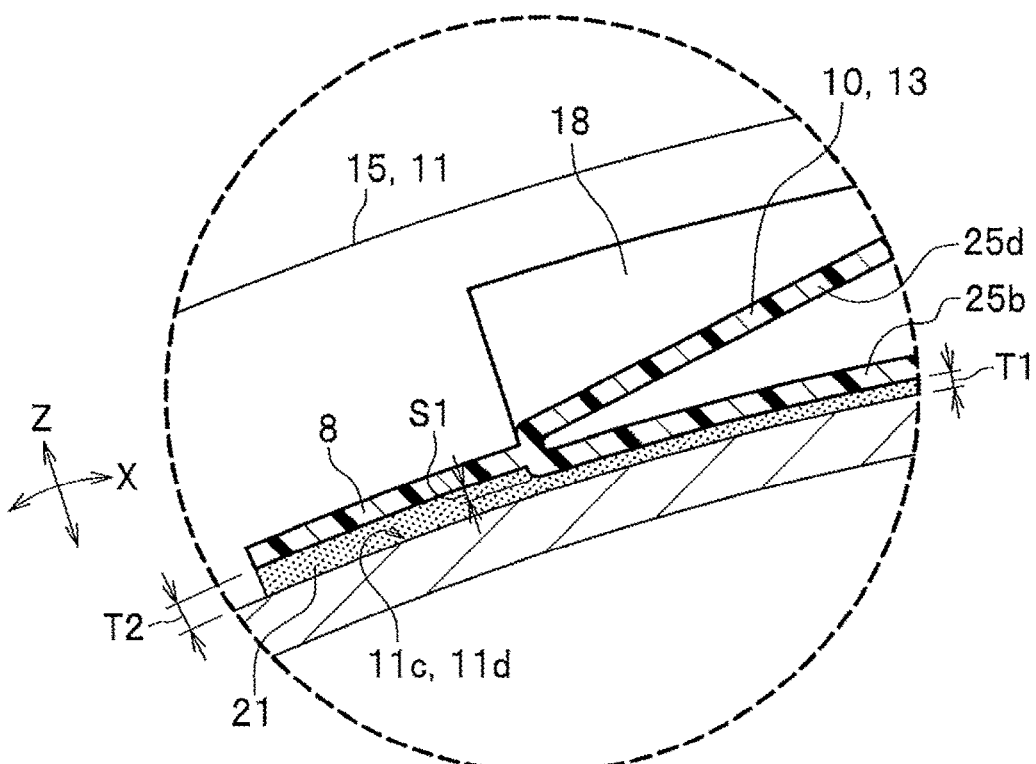
FIG. 6 is a partially enlarged sectional view of the part VI indicated by an arrow in FIG. 4.

FIG. 6 is a partially enlarged sectional view of the part VI indicated by an arrow in FIG. 4.

As shown in FIG. 6, the sub-air chamber member 10 (Helmholtz resonator) has a stepped part S1 formed to be away from the outer circumferential surface 11d of the well part 11c (the wheel), at an end part of the Helmholtz resonator in the wheel circumferential direction X. The stepped part S1 is formed by a difference between a distance from the outer circumferential surface 11d of the well part 11c to the plate-like extension part 8 and a distance from the outer circumferential surface 11d of the well part 11c to the bottom part 25b of the main body 13.

The adhesive material 21 is interposed between the plate-like extension part 8 and the outer circumferential surface 11d, and between the bottom part 25b and the outer circumferential surface 11d.

More specifically, the adhesive material 21 having the film thickness T1 is interposed between the bottom part 25b and the outer circumferential surface 11d, and the adhesive material 21 having the film thickness T2 thicker than the film thickness T1 depending on the stepped part S1 is interposed between the plate-like extension part 8 and the outer circumferential surface 11d.

Note that in FIG. 6, reference sign 15 denotes the vertical wall of the rim 11; reference sign 18 denotes the tubular body; and reference sign 25d denotes the inclined part of the main body 13.

Operation and Effects

Next, description will be given of operation and effects of the vehicle wheel 1 according to the present embodiment.

The vehicle wheel 1 according to the present embodiment allows the sub-air chamber member 10 (Helmholtz resonator) to be mounted on the rim 11 with the adhesive material 21.

The vehicle wheel 1 thus configured differs from the conventional vehicle wheel (for example, see Patent document 1) and has no need to cut and form a circumferential groove for mounting the sub-air chamber member 10 on the rim 11. Accordingly, the vehicle wheel 1 makes it possible to simplify a manufacturing process to reduce a manufacturing cost as compared to the conventional art.

The vehicle wheel 1 according to the present embodiment allows a thickness of the adhesive material 21 on the part of the sub-air chamber member 10 on which the centrifugal force acts strongly during rotation of the wheel to be thicker than a thickness of the adhesive material 21 on the other parts of the sub-air chamber member 10.

On the adhesive material 21 in the vehicle wheel 1, the centrifugal force acts in a peeling direction. In contrast, peel strength [N/mm] of the adhesive material 21 becomes higher unlike shear strength [N/mm$^2$] as the film thickness becomes thicker.

The vehicle wheel 1 according to the present embodiment allows the adhesive material 21 to be thickly applied on the part on which the centrifugal force acts strongly, thereby making it possible to further enhance the fixing strength of the sub-air chamber member 10 to the rim 11.

Moreover, in the vehicle wheel 1, the sub-air chamber member 10 has the plate-like extension part 8 provided at the end part thereof in the wheel circumferential direction X, the plate-like extension part 8 being adhered on the outer circumferential surface 11d of the well part 11c (the wheel).

Herein, suppose the film thickness as the adhesive material 21 interposed between the outer circumferential surface 11d of the well part 11c and the main body 13 of the sub-air chamber member 10 is constant. Moreover, suppose the centrifugal force acting on the sub-air chamber member 10 during rotation of the wheel is applied equally in the wheel circumferential direction X.

Shear adhesion of the main body 13 obtained by the adhesive material 21 on the outer circumferential surface 11d is weaker in an adhesive part at the end part in the wheel circumferential direction X of the main body 13 than in an arbitrary adhesive part at the middle part in the wheel circumferential direction X of the main body 13. That is, the end part of the main body 13 is more easily peeled off by the centrifugal force than the middle part.

In contrast, the vehicle wheel 1 according to the present embodiment has the plate-like extension part 8 adhered on the outer circumferential surface 11d of the well part 11c as described above, thus allowing shear adhesion of the sub-air chamber member 10 to the outer circumferential surface 11d of the well part 11c to be further enhanced when the centrifugal force acts on the sub-air chamber member 10.

Note that the plate-like extension part 8 is located on the more outer side than the bottom part 25*b* in the wheel radial direction Z, thereby constituting the adhesive strength increasing part 7*b* relative to the bottom part 25*b* as the regular part 7*a* as described above.

Moreover, in the vehicle wheel 1, the film thickness T2 of the adhesive material 21 on the part in which the stepped part S1 of the sub-air chamber member 10 is formed, i.e., on the plate-like extension part 8, is set to be thicker than the film thickness T1 of the adhesive material 21 on the other parts, i.e., on the bottom part 25*b* of the main body 13.

The vehicle wheel 1 thus configured allows fixing strength of the plate-like extension part 8 to the outer circumferential surface 11*d* of the well part 11*c* to be further enhanced, thereby allowing shear adhesion of the sub-air chamber member 10 to the outer circumferential surface 11*d* of the well part 11*c* to be extremely enhanced.

Moreover, in the vehicle wheel 1, the volume of the sub-air chamber SC is gradually reduced from the central part in the wheel circumferential direction X of the main body 13 toward the edge in the wheel circumferential direction X of the main body 13, i.e., toward the leading end Le of the main body 13 shown in FIG. 4.

The vehicle wheel 1 thus configured allows the upper part 25*a* of the main body 13 to be displaced so as to gradually come near the bottom part 25*b* as the upper part 25*a* extends toward the leading end Le of the main body 13.

That is, the distance r from the rotation center of the mass point (m) of materials forming the upper part 25*a*, in other words, of the mass point (m) being a constituent element of the centrifugal force (mrω², where ω is a turning angle velocity) becomes shorter as the upper part 25*a* extends toward the leading end Le of the main body 13. As a result, the centrifugal force acting on the main body 13 becomes smaller as the upper part 25*a* extends toward the leading end Le.

Accordingly, the vehicle wheel 1 allows shear adhesion of the sub-air chamber member 10 to the outer circumferential surface 11*d* to be further enhanced at the end part in the wheel circumferential direction X of the main body 13.

Moreover, in the vehicle wheel 1 according to the present embodiment, the upper part 25*a* of the main body 13 is connected via the bridge 33 to the bottom part 25*b* that is adhered and restrained on the outer circumferential surface 11*d* of the well part 11*c*. That is, the upper part 25*a* is rigidly supported via the bridge 33 and the bottom part 25*b* on the outer circumferential surface 11*d* of the well part 11*c*. This makes it possible, even if the centrifugal force F acts on the sub-air chamber member 10, to more reliably inhibit the upper part 25*a* from swelling out in the centrifugal direction.

Accordingly, the sub-air chamber member 10 thus configured makes it possible to more reliably prevent a change in the volume of the sub-air chamber SC. In other words, the vehicle wheel 1 provided with the sub-air chamber member 10 makes it possible to more reliably maintain a designed proper resonance frequency in the sub-air chamber member 10.

Moreover, in the vehicle wheel 1 according to the present embodiment, the joining part 33*c* of the bridge 33 between the bottom part 25*b* and the upper part 25*a* is formed to be displaced to the outer circumferential surface 11*d* side (the wheel side) of the well part 11*c*.

The inside of the lower side connecting part 33*b* of the bridge 33 thus formed can also be filled with the adhesive material 21 as described above.

The vehicle wheel 1 thus configured also makes it possible to increase the film thickness of the adhesive material 21 to enhance the peel strength of the adhesive material 21.

Although the embodiment of the present invention has been described above, the present invention is not limited to the above embodiment and can be put into practice in various forms.

Figure 7:
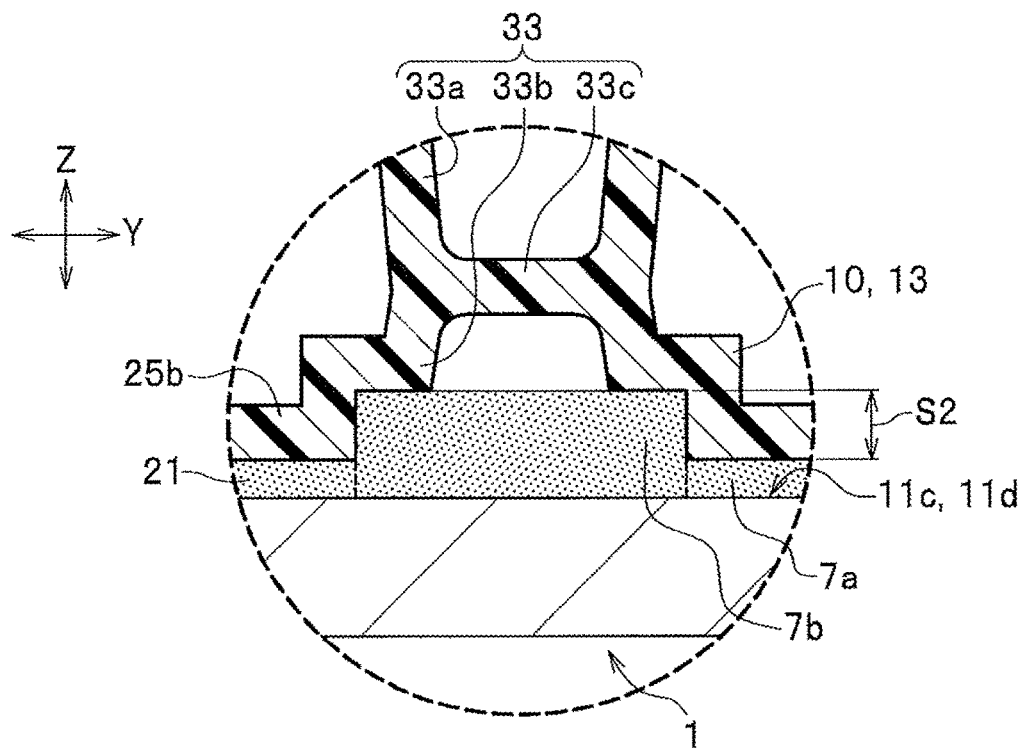
FIG. 7 is a partially enlarged sectional view of the periphery of a lower part of a bridge in a vehicle wheel according to a first modification.
Figure 8:
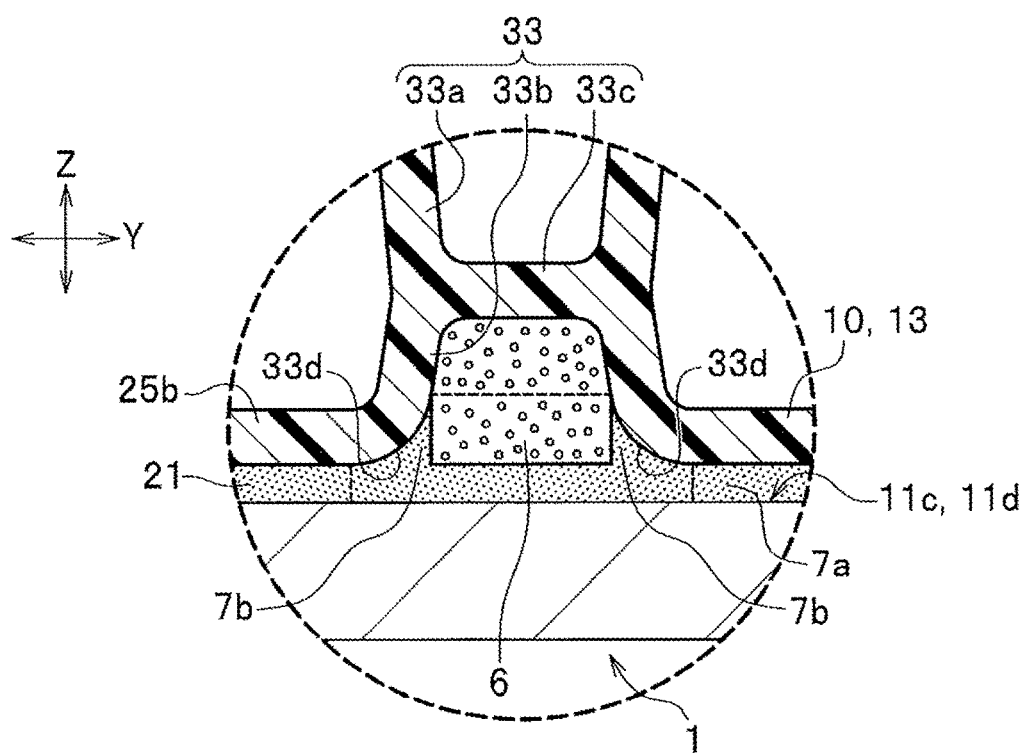
FIG. 8 is a partially enlarged sectional view of the periphery of a lower part of a bridge in a vehicle wheel according to a second modification.

FIG. 7 is a partially enlarged sectional view of the periphery of a lower part of the bridge 33 in the vehicle wheel 1 according to a first modification. FIG. 8 is a partially enlarged sectional view of the periphery of a lower part of the bridge 33 in the vehicle wheel 1 according to a second modification. Note that in FIG. 7 and FIG. 8, the same constituent element as in the above embodiment is given the same reference sign and thus detailed explanation thereof is omitted.

As shown in FIG. 7, the vehicle wheel 1 according to the first modification has a stepped part S2 provided at the lower place of the bridge 33 of the main body 13, the stepped part S2 being formed so as to diameter-enlarging an opening of the lower part of the lower side connecting part 33*b*. Formation of the stepped part S2 allows a cylindrical diameter-enlarged space to be formed inside the lower part of the lower side connecting part 33*b*.

The cylindrical space is filled with the adhesive material 21, thereby allowing the film thickness of the adhesive material 21 filled into the cylindrical space to be thicker than the film thickness of the adhesive material 21 on the bottom part 25*b* of the main body 13.

The vehicle wheel 1 thus configured makes it possible to more reliably apply the adhesive material 21 thickly on the lower place of the bridge 33 on which centrifugal force acts strongly. This makes it possible for the vehicle wheel 1 to further enhance the fixing strength of the sub-air chamber member 10 to the outer circumferential surface 11*d* of the well part 11*c*.

As shown in FIG. 8, the vehicle wheel 1 according to the second modification has an elastic foamed member 6 filled inside the lower side connecting part 33*b*. The elastic foamed member 6 is filled through the opening of the lower side connecting part 33*b* before the adhesive material 21 is applied on the sub-air chamber member 10.

The elastic foamed member 6 fills, of an internal space formed inside the lower side connecting part 33*b*, the internal space of the lower side connecting part 33*b* exclusive of a corner radius section 33*d* that expands the opening of the lower side connecting part 33*b*.

The adhesive material 21 is filled into only the corner radius section 33*d* of the internal space of the lower side connecting part 33*b*. Moreover, the adhesive material 21 is applied between the elastic foamed member 6 and the outer circumferential surface 11*d* of the well part 11*c*, with the same film thickness as the adhesive material 21 interposed between the bottom part 25*b* of the main body 13 and the outer circumferential surface 11*d*.

Examples of the elastic foamed member 6 include what is called a sponge consisting of a foamed body such as urethane resin, silicone resin and acrylic resin, but the elastic foamed member is not limited to these examples.

The vehicle wheel 1 thus configured prevents the adhesive material 21 from being filled into the entire internal space of the lower side connecting part 33*b*. That is, the vehicle wheel 1 makes it possible to maintain flexibility of the sub-air chamber member 10 per se where the adhesive material 21 to be used is of a type not having elasticity after curing. Accordingly, the vehicle wheel 1 makes it possible to expand the width of selection of the type of the adhesive material 21 to be used.

Moreover, although the plate-like extension part 8 of the sub-air chamber member 10 shown in FIG. 2 in the above embodiment has a rectangular shape in planar view, the plate-like extension part 8 is not limited to this embodiment.

Figure 9A:
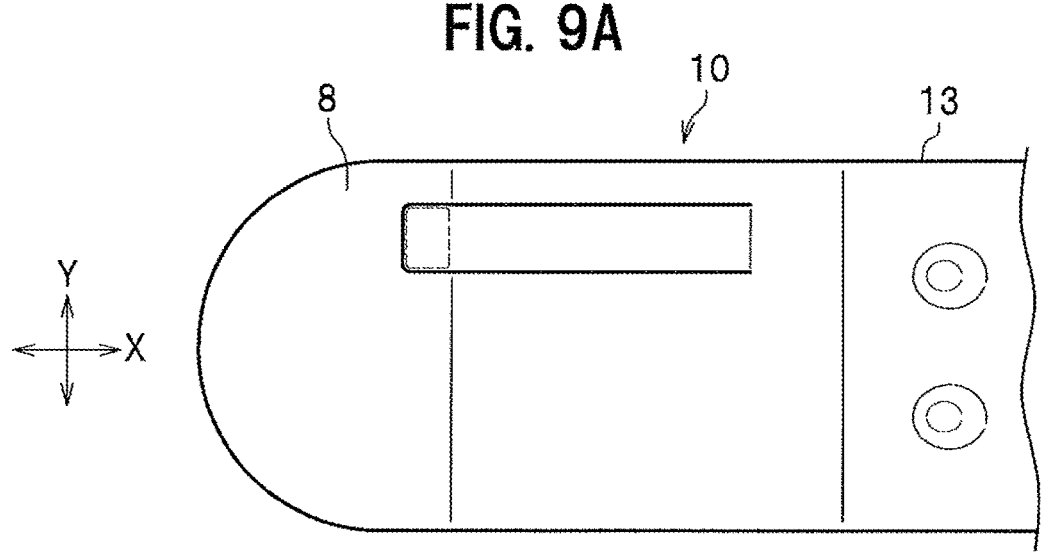
FIGS. 9A, 9B and 9C are partial plan views of a Helmholtz resonator showing modifications of an end part of the Helmholtz resonator in a wheel circumferential direction.
Figure 9B:
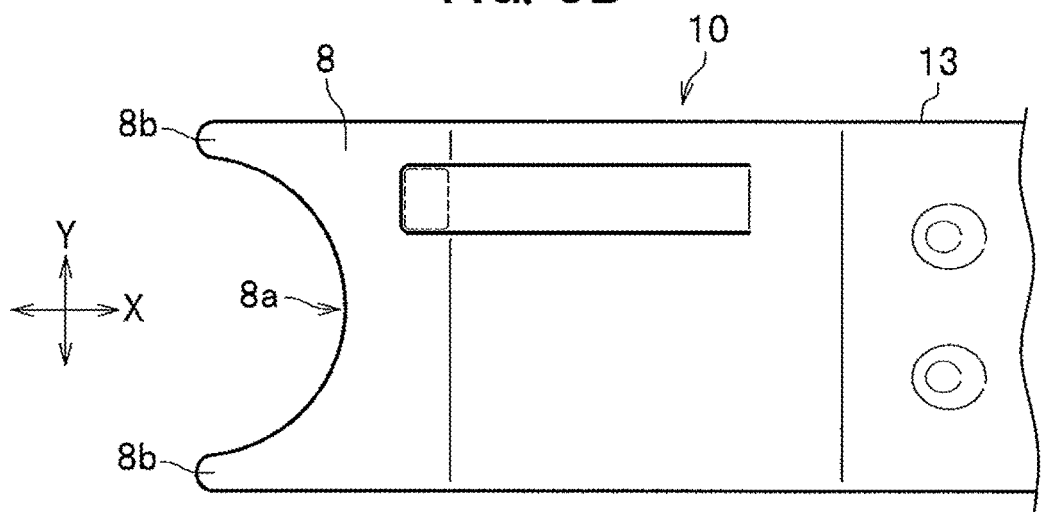
Figure 9C:
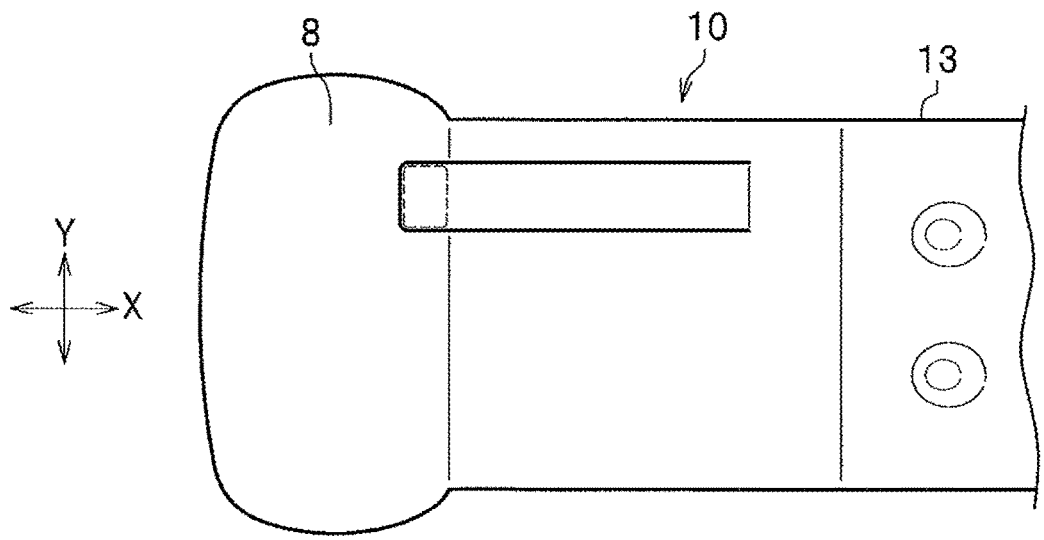

FIGS. 9A, 9B and 9C to be next referred to are partial plan views of the sub-air chamber member 10 showing modifications of the plate-like extension part 8 of the sub-air chamber member 10.

The plate-like extension part 8 shown in FIG. 9A has a semicircular shape such that a leading end side thereof in the wheel circumferential direction X forms an arc in planar view.

The sub-air chamber member 10 having the plate-like extension part 8 thus formed makes it possible to achieve size reduction of the plate-like extension part 8 while securing a sufficient adhesive surface thereof to the outer circumferential surface 11*d* (see FIG. 1) of the well part 11*c* (see FIG. 1).

The plate-like extension part 8 shown in FIG. 9B has a cut-out part 8*a* of a semicircular shape such that the main body 13 side forms an arc in planar view.

The sub-air chamber member 10 having the plate-like extension part 8 thus formed makes it possible to secure adhesive surfaces at spots far away from the main body 13 in the wheel circumferential direction X, by a pair of extension parts 8*b* across the cut-out part 8*a* in the wheel width direction Y, and to achieve weight saving of the plate-like extension part 8 per se by the cut-out part 8*a*.

According to the sub-air chamber member 10 having the plate-like extension part 8 thus formed, shear adhesion of the sub-air chamber member 10 to the outer circumferential surface 11*d* (see FIG. 1) of the well part 11*c* (see FIG. 1) can be further enhanced.

The plate-like extension part 8 shown in FIG. 9C has an oval shape with a long diameter in the wheel width direction Y in planar view.

The sub-air chamber member 10 having the plate-like extension part 8 thus formed allows an adhesive surface thereof to the outer circumferential surface 11*d* (see FIG. 1) of the well part 11*c* (see FIG. 1) to be increased, thus making it possible to enhance shear adhesion of the sub-air chamber member 10.

Moreover, although the vehicle wheel 1 in the above embodiment allows the main body 13 of the sub-air chamber member 10 to be disposed between the vertical wall 15*a* and the vertical wall 15*b*, configuration may be adopted such that at least one of the vertical wall 15*a* and the vertical wall 15*b* is omitted.

Although embodiments of the present invention have been described and illustrated in detail, the disclosed embodiments are made for purposes of illustration and example only and not limitation. The scope of the present invention should be interpreted by terms of the appended claims.

DESCRIPTION OF REFERENCE SIGNS

1: Vehicle wheel; 6: Elastic foamed member; 7*a*: Regular part; 7*b*: Adhesive strength increasing part; 8: Plate-like extension part; 8*a*: Cut-out part; 8*b*: Extension part; 9: Tire air chamber; 10: Sub-air chamber member; 11: Rim; 11*c*: Well part; 11*d*: Outer circumferential surface; 12: Disk; 13: Main body; 14: Side face; 15: Vertical wall; 15*a*: Vertical wall; 15*b*: Vertical wall; 16: Partition wall; 17: Rising part; 18: Tubular body; 18*a*: Communication hole; 19: Circumferential wall; 21: Adhesive material; 25*a*: Upper part; 25*b*: Bottom part; 25*c*: Side part; 25*d*: Inclined part; 33: Bridge; 33*a*: Upper side connecting part; 33*b*: Lower side connecting part; 33*c*: Joining part; 33*d*: Corner radius section; F: Centrifugal force; Le: Leading end; P: Connecting point; S1: Stepped part; S2: Stepped part; SC: Sub-air chamber; T1: Film thickness; T2: Film thickness; X: Wheel circumferential direction; Y: Wheel width direction; Z: Wheel radial direction

What is claimed is:

1. A vehicle wheel comprising a Helmholtz resonator mounted on a rim with an adhesive material, wherein
the rim includes a well part which is recessed inward in a wheel radial direction,
the Helmholtz resonator has a plate-like extension part provided at an end part thereof in a wheel circumferential direction of the Helmholtz resonator, the plate-like extension part extending in the wheel circumferential direction to be adhered on the rim,
the Helmholtz resonator has a stepped part formed to be away from the rim, at an end part in the wheel circumferential direction of the Helmholtz resonator, and
a thickness of the adhesive material on a part of the Helmholtz resonator in which the stepped part is formed is set to be thicker than a thickness of the adhesive material on other parts of the Helmholtz resonator.

2. The vehicle wheel according to claim 1, wherein the Helmholtz resonator is adhered to follow an outer circumferential surface of the well part, and
the Helmholtz resonator allows volume of a sub-air chamber thereof to be reduced from a central part toward an edge in the wheel circumferential direction of the Helmholtz resonator.

3. The vehicle wheel according to claim 1, wherein
the Helmholtz resonator is adhered to follow an outer circumferential surface of the well part, and includes:
a bottom part that is disposed at the outer circumferential surface side of the well part; an upper part that forms a sub-air chamber between the bottom part and the upper part; and a bridge that connects the bottom part with the upper part, and wherein
the Helmholtz resonator has the stepped part formed to be away from the rim, on a periphery of the bridge in the bottom part, and
the thickness of the adhesive material on a part of the Helmholtz resonator in which the stepped part is formed is set to be thicker than a thickness of the adhesive material on a periphery of the stepped part.

4. The vehicle wheel according to claim 1, wherein
the Helmholtz resonator is adhered to follow an outer circumferential surface of the well part, and includes:
a bottom part that is disposed at the outer circumferential surface side of the well part; an upper part that forms a sub-air chamber between the bottom part and the upper part; and a bridge that connects the bottom part with the upper part, and wherein
a joining part of the bridge between the bottom part and the upper part is formed to be displaced to the rim side.

5. The vehicle wheel according to claim 1, wherein
the Helmholtz resonator is adhered to follow an outer circumferential surface of the well part, and includes:
a bottom part that is disposed at the outer circumferential surface side of the well part; an upper part that forms a sub-air chamber between the bottom part and the upper part; and a bridge that connects the bottom part with the upper part, and wherein an elastic foamed member is filled into the bridge through an opening of the bridge formed on the bottom part side.

\* \* \* \* \*